US012091151B2

(12) United States Patent
Rouzade

(10) Patent No.: US 12,091,151 B2
(45) Date of Patent: Sep. 17, 2024

(54) AIRCRAFT DOOR WITH RETRACTION OF THE MEANS FOR RETAINING THE DEPLOYABLE EVACUATION DEVICE

(71) Applicant: LATECOERE, Toulouse (FR)

(72) Inventor: Emmanuel Rouzade, Bessieres Occitaine (FR)

(73) Assignee: LATECOERE, Toulouse (FR)

( * ) Notice: Subject to any disclaimer, the term of this patent is extended or adjusted under 35 U.S.C. 154(b) by 182 days.

(21) Appl. No.: 17/756,667

(22) PCT Filed: Nov. 30, 2020

(86) PCT No.: PCT/EP2020/083836
§ 371 (c)(1),
(2) Date: May 31, 2022

(87) PCT Pub. No.: WO2021/110572
PCT Pub. Date: Jun. 10, 2021

(65) Prior Publication Data
US 2022/0411040 A1    Dec. 29, 2022

(30) Foreign Application Priority Data

Dec. 6, 2019    (FR) ...................................... 1913846

(51) Int. Cl.
*B64C 1/14*      (2006.01)
*B64D 25/14*     (2006.01)

(52) U.S. Cl.
CPC ............ *B64C 1/1423* (2013.01); *B64D 25/14* (2013.01)

(58) Field of Classification Search
CPC ..... B64C 1/1407; B64C 1/1423; B64C 1/143; B64C 1/1461; B64D 25/08; B64D 25/14
See application file for complete search history.

(56) References Cited

U.S. PATENT DOCUMENTS

| 3,634,914 A | * | 1/1972 | Schroedter ............. B64D 25/14 24/609 |
| 5,400,985 A | * | 3/1995 | Banks .................... B64D 25/14 193/25 B |
| 5,738,303 A | * | 4/1998 | Hamatani .............. B64D 25/14 244/905 |
| 2002/0043807 A1 | | 4/2002 | Oaten |

(Continued)

FOREIGN PATENT DOCUMENTS

FR    2576217    7/1986

*Primary Examiner* — Michael C Zarroli
*Assistant Examiner* — Ka Chun Leung
(74) *Attorney, Agent, or Firm* — Defillo & Associates, Inc.; Evelyn A. Defillo

(57) ABSTRACT

An aircraft door including a retaining device for a deployable evacuation device, the retaining device having at least: a beam; a first retention member fixed on a second end of the beam by a detachable clip, the first retention member being connected to the deployable evacuation device; a second retention member, which can be coupled to the first retention member, mounted on the door frame; retraction devices that moves between: an activated position, in which the second retention member is on the trajectory of the first retention member, and a deactivated position, in which the second retention member is outside the trajectory of the first retention member.

11 Claims, 8 Drawing Sheets

(56) References Cited

U.S. PATENT DOCUMENTS

2009/0020648 A1\* 1/2009 Bullesbach ............ B64D 25/14
 244/137.2
2016/0107755 A1\* 4/2016 Bessettes ............... B64D 25/14
 49/141

\* cited by examiner

AIRCRAFT DOOR WITH RETRACTION OF THE MEANS FOR RETAINING THE DEPLOYABLE EVACUATION DEVICE

CROSS REFERENCE TO RELATED APPLICATION

This application is a national stage entry of PCT/EP2020/083836 filed Nov. 30, 2020, under the International Convention and claiming priority over French Patent Application No. FR1913846 filed Dec. 6, 2019.

TECHNICAL FIELD

The invention relates to the field of aeronautics and more particularly concerns aircraft doors equipped with a deployable evacuation device.

Aircraft having access doors which are located at a significant height above the ground when the aircraft is on the ground, in particular almost all airliners, are generally equipped with a deployable evacuation device such as a self-inflating slide mounted on the door leaf.

These aircraft doors generally have means for retaining the deployable evacuation device, these retaining means being designed to assume two positions: an armed position and a disarmed position. In the armed position, the retaining means are secured to the frame, so as to allow the triggering and the fixing of the deployable evacuation device, in the event of evacuation. In the disarmed position, the retaining means are freely movable relative to the frame so as to allow the door to be opened under normal operating conditions.

The retaining means associated with the deployable evacuation device thus fulfil two functions:

a first function, in which they exert a pull on the trigger of the deployable evacuation device when the door is opening, thereby controlling the deployment of the evacuation device;

a second function, in which they connect the evacuation device, once it has been deployed, to the door frame, to allow evacuation.

PRIOR ART

Aircraft doors of the prior art that have a deployable evacuation device as described in patent application FR2576217 are usually equipped with a retaining bar which is connected by an apron to the deployable escape device. A pull on this retaining bar with respect to the deployable evacuation device makes it possible to trigger the deployment of the latter. This retaining bar is designed to interact with threshold jaws fixed to the door frame, at the floor of the aircraft. The door is locked by a downward movement of the leaf with respect to its frame, which allows the locking of abutments present between the leaf and the frame, and which also allows the positioning of the retaining bar in the jaws at the door threshold.

These threshold jaws are moreover equipped with a locking mechanism making it possible to close the jaws on the retaining bar. In the armed position, the jaws are locked on the retaining bar and, if the door is opened with a view to evacuation, the retaining bar remains engaged in the jaws and the opening movement of the door thus triggers the deployment of the evacuation device, the latter then remaining fixed to the door frame by the retaining bar, which is still locked in the jaws. In the disarmed position, the jaws are not interlocked, and the retaining bar is freely movable with respect to the jaws, at least in an upward movement. In this disarmed position, when the door is unlocked by an upward movement (in order to release the abutments present between the door and its frame), the retaining bar is removed from the jaws and the door can then be opened normally.

These aircraft doors of the prior art have some drawbacks.

First of all, for the operation of the deployable evacuation device, these doors need to be locked and unlocked by a downward or upward movement of the leaf with respect to its frame. These devices thus require a vertical movement of the door and cannot be implemented with doors moving in an alternative way, involving for example no movement in the vertical direction.

These doors also require a complex mechanical device for actuating the locking of the threshold jaws from a control lever mounted on the door leaf.

In addition, the threshold jaws are projecting elements which protrude from the floor of the aircraft. The possible positionings of these jaws are limited to locations outside the clear opening, defined by regulations, intended for the passage of passengers. The protruding and projecting nature of the jaws also leads to risks linked to the accumulation of dust, objects (coins, etc.) that can be dropped into the jaws by the passengers and that can disrupt the operation.

Furthermore, the structure of an aircraft in flight is generally subject to movements that cause relative displacements between the door and its threshold floor. The joint between the retaining bar and the threshold jaws must therefore be provided with large clearances permitting such a relative movement, thereby resulting in oversizing of the threshold jaws and a risk of indiscriminate mechanical noise occurring under the effect of vibrations.

There are also aircraft doors in which the movement of disengaging the abutments and of opening is realized by a sequence of rotations about two vertical axes. Such doors are characterized by the absence of vertical movement and exhibit a considerable retraction movement into the aircraft when they are opened. The retaining bar is engaged either manually or by means of a slideway mechanism. An intermediate part supporting the retaining bar is sometimes engaged by sliding on the frame (armed) or on the leaf (disarmed). In both cases, the deployment of the evacuation device is brought about by the pull on the retaining bar when the door is opened. The manual engagement of the retaining bar is currently no longer acceptable for new aircraft and the mechanism associated with this type of door is complex and very sensitive to jamming.

SUMMARY OF THE INVENTION

The object of the invention is to improve the aircraft doors of the prior art.

To this end, the invention concerns an aircraft door having:
a door frame;
a leaf having an internal face intended to be turned toward the interior of the aircraft, the leaf being movable with respect to the door frame between a closed position and an open position;
a deployable evacuation device mounted on the leaf and having retaining means designed to assume: an armed position and a disarmed position.

In addition, this aircraft door comprises retaining means having at least one retaining assembly:
a beam having a first end fixed to the internal face of the leaf, this beam extending substantially perpendicularly to the leaf;

a first retaining member fixed to a second end of the beam via a detachable clip, this first retaining member being connected to the deployable evacuation device;

a second retaining member, couplable to the first retaining member, mounted on the door frame;

retraction means movable between: a primed position, in which the second retaining member is in the path of the first retaining member when the leaf passes from its closed position to its open position; and a deactivated position, in which the second retaining member is outside the path of the first retaining member when the leaf passes from its closed position to its open position.

Another subject of the invention concerns a method for opening such an aircraft door, this method comprising the following steps:

placing the retraction means in the primed position;

driving the leaf in an opening movement along a first travel in which the first retaining member is driven until it meets the second retaining member;

continuing the opening movement of the leaf along a second travel in which the first retaining member remains coupled to the second retaining member and comes away from the beam.

Such an aircraft door does not require any projecting element arranged on the door threshold of the aircraft, such that there is no need to fear any problems relating to safety, jamming, or sensitivity to the accumulation of dust or some other hindrance at the door threshold. The second retaining member can thus be positioned at the most optimum location, possibly in the clear opening area.

The means for triggering the deployable evacuation device are completely independent of the means for locking the aircraft door on its door frame. Such an aircraft door can thus be locked or unlocked by any means, such as conventional up/down movements, but also, for example, by lateral movements of the leaf out of the door frame, or else controlled movable abutment devices. The aircraft door fitted with the retaining means according to the invention can thus be implemented with all types of locking/unlocking means.

In addition, the retaining means, although they are armed, pass into the engaged position only when the door is actually being opened, and only when this opening is large enough for the first retaining member to associate with the second retaining member. In other words, the deployable evacuation device is triggered only when a sufficiently large opening movement of the door takes place, that is to say when the user has indicated an intention to open the door by triggering the deployable evacuation means. An opening movement of the door which would be short of the point of association of the first and second retaining members permits it to be returned by bringing the door back to the closed position without triggering the deployable evacuation device. Even when it is armed, the aircraft door thus ensures an initial opening range of the door (depending on the length of the beam) permitting the door to be opened by mistake, without consequences.

The invention goes against the current practice in the field of aeronautics of arming the retaining means by interlocking them in jaws, when the aircraft is in flight, and of disarming them only when the aircraft is on the ground. According to the invention, the retaining means, when they are armed, can have two positions: an armed position awaiting engagement; or an armed and engaged position. Thus, during flight, the retaining means are armed but awaiting engagement whereas the retraction means, for their part, are in the primed position, such that in the event of the door being opened, the retaining means automatically pass into the engaged position beyond a certain opening amplitude of the door.

The invention thus makes it possible to make the retaining means independent of the relative movements between the door and the floor when the aircraft is in flight.

The aircraft door according to the invention may have the following additional features, taken alone or in combination:

the leaf comprises a door structure, and the beam is fixed to the door structure;

the detachable clip has an elastically deformable fixing element for fixing the first elastic member to the beam;

the detachable clip has a fixing receiving portion on the beam and also an elastic tab, and the first retaining member has a fixing head designed to be received in the fixing receiving portion and to be held in place by the elastic tab;

the second retaining member is mounted on a threshold portion of the door frame;

one of the first and the second retaining member has a retaining bar and the other of the first and the second retaining member has a hook that can be coupled to the retaining bar;

the hook has a pawl for holding the retaining bar in the hook;

the second retaining member is movable between a protruding position and a retracted position, the retraction means being associated with the second retaining member such that the primed position of the retraction means triggers the protruding position of the second retaining member, and the deactivated position of the retraction means triggers the retracted position of the second retaining member;

the retraction means have a chassis and a pivot pin on which the second retaining member is mounted so as to pivot between its retracted position and its protruding position;

the retraction means have an elastic means pushing the second retaining member back into its stable protruding or retracted position;

the door comprises two retaining assemblies arranged on either side of the leaf.

BRIEF DESCRIPTION OF THE FIGURES

Other features and advantages of the invention will emerge from the nonlimiting description which follows, with reference to the appended drawings in which.

DETAILED DESCRIPTION OF THE INVENTION

Figure 1:
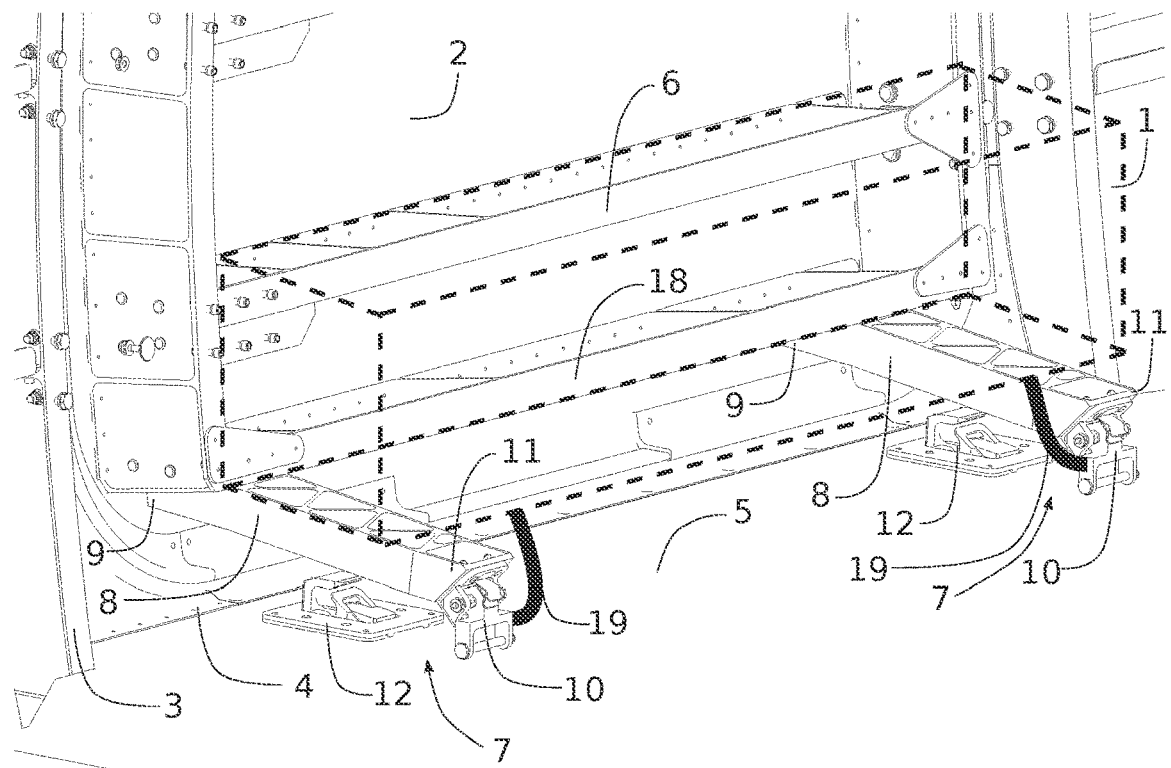
FIG. 1 is a partial representation of a door according to the invention.

FIG. 1 shows a perspective view of a portion of an aircraft door according to the invention. This illustrative view shows the bottom of the aircraft door in place in the fuselage 1 of an aircraft.

The aircraft door comprises a leaf 2 and a door frame 3. The door is shown in the closed position in FIG. 1. The door is also designed to assume an open position in which the leaf 2 is disengaged from the door frame 3. To that end, the door comprises a locking/unlocking and opening/closing mechanism which is not the subject of the invention and will therefore not be described in more detail here. These known mechanisms make the leaf 2 movable between the closed position shown in FIG. 1 and an open position in which the leaf 2 is displaced against the outside of the fuselage leaving free the passage opened up by the door frame 3.

The door frame 3 is formed by a structure arranged around the leaf 2 and fixed to the fuselage 1 of the aircraft. This door frame 3 also has a threshold portion 4 extending under the floor 5 of the aircraft.

The aircraft door comprises a deployable evacuation device 6, such as a self-inflating slide, mounted on the leaf 2 (shown schematically in dashed lines in FIG. 1).

The aircraft door further comprises retaining means connected to the deployable evacuation device 6 so as to allow it to be triggered and to be fixed to the door frame 3 of the door. In this instance, these retaining means comprise two identical retaining assemblies 7.

Figure 2:
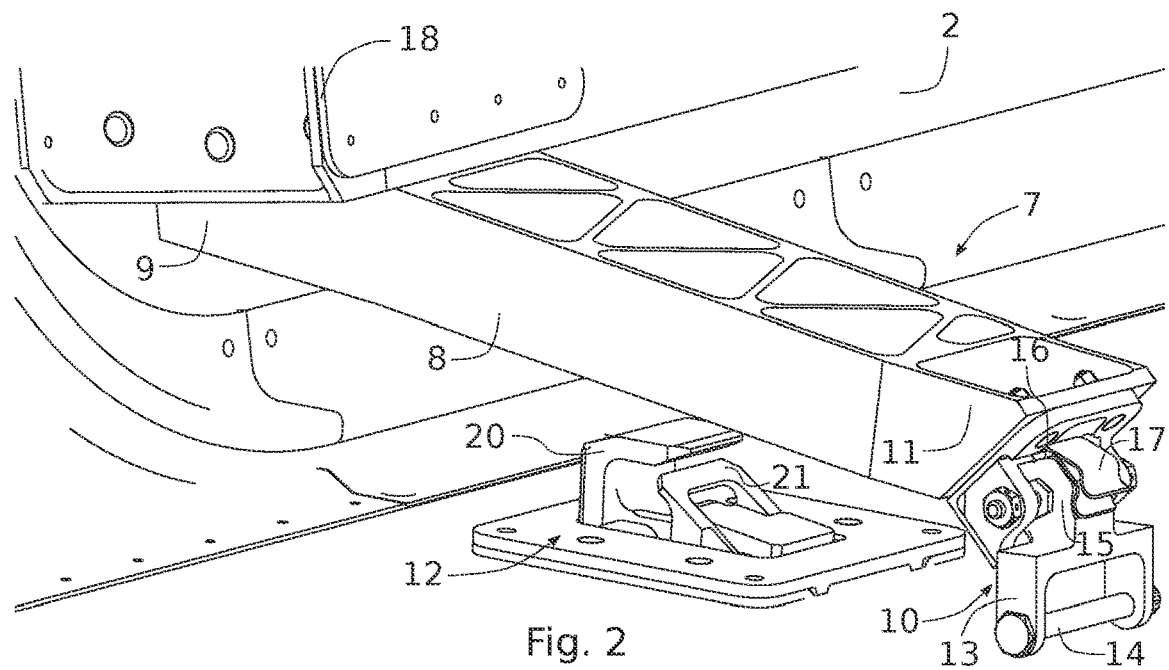
FIG. 2 is a perspective view of an assembly for retaining the door of FIG. 1, in a first position, the retraction means being in the primed position.
Figure 3:
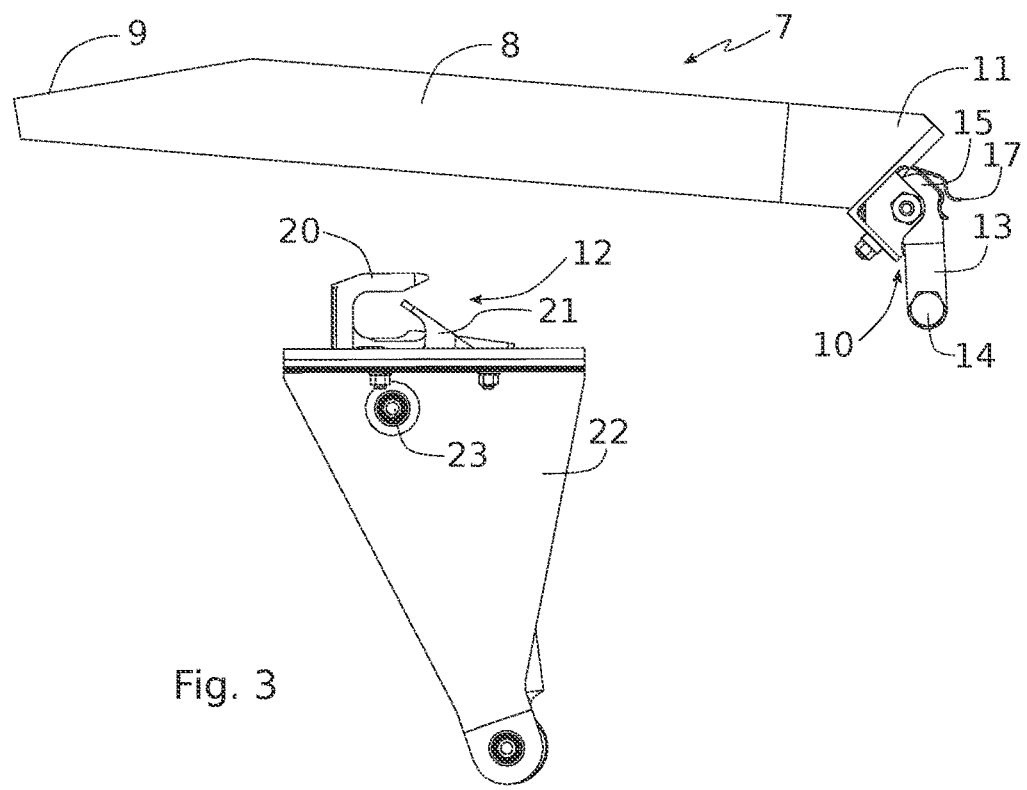
FIG. 3 is a profile view of FIG. 2.

FIG. 2 is an enlarged view of a portion of FIG. 1 and shows one of the retaining assemblies 7 in more detail. FIG. 3 is a profile view of the retaining assembly 7 shown in FIG. 2. Each of the retraining assemblies 7 has:
- a beam 8, one end 9 of which is fixed to the leaf 2;
- a first retaining member 10 fixed to a second end 11 of the beam 8;
- a second retaining member 12 fixed, in the present example, to the threshold portion 4 of the door frame 3.

FIG. 3 does not show the floor 5 of the aircraft, making it possible to see the chassis 22 supporting the second retaining member 12.

In the present example, the first retaining member 10 is constituted by a yoke 13 supporting a retaining bar 14 which extends substantially orthogonally to the direction in which the beam 8 extends. The first retaining member 10 also has a fixing head 15 which is inserted in a fixing receiving portion 16 secured to the second end 11 of the beam 8. The fixing head 15 is held inside the fixing receiving portion 16 by an elastic holding means which in this instance is constituted by an elastic tab 17. The fixing receiving portion 16 and the elastic tab 17 thus constitute a detachable clip for fixing the first retaining member 10 to the beam 8. This clip formed by the fixing receiving portion 16 and the elastic tab 17 is referred to as detachable because, if a sufficient tensile force is exerted on the retaining bar 14, the first retaining member 10 comes away from the beam 8. In this example, the detachable clip is secured to the beam 8 and accommodates the first retaining member 10 allowing it to come away. As a variant, the detachable clip may be secured to the first retaining member 10 and allow the latter to come away from the beam 8.

The first retaining member 10 is also connected to the deployable evacuation device 6 by straps 19 (see FIG. 1).

The beam 8 is fixed to the leaf 2 such that the beam 8 extends substantially perpendicularly to the leaf 2. In the present example, the leaf 2 has a set of reinforcing stringers 18 (see FIG. 1) and the beam 8 is fixed to one of these stringers 18. The beam 8 is referred to as substantially perpendicular to the leaf 2 in as much as this beam 8 extends transversely to the leaf 2, at angles of approximately 80° to 100°.

The second retaining member 12 has a hook 20 and a pawl 21. The second retaining member 12 complements the first retaining member 10, since the retaining bar 14 is designed to be accommodated in the hook 20.

Figure 10:
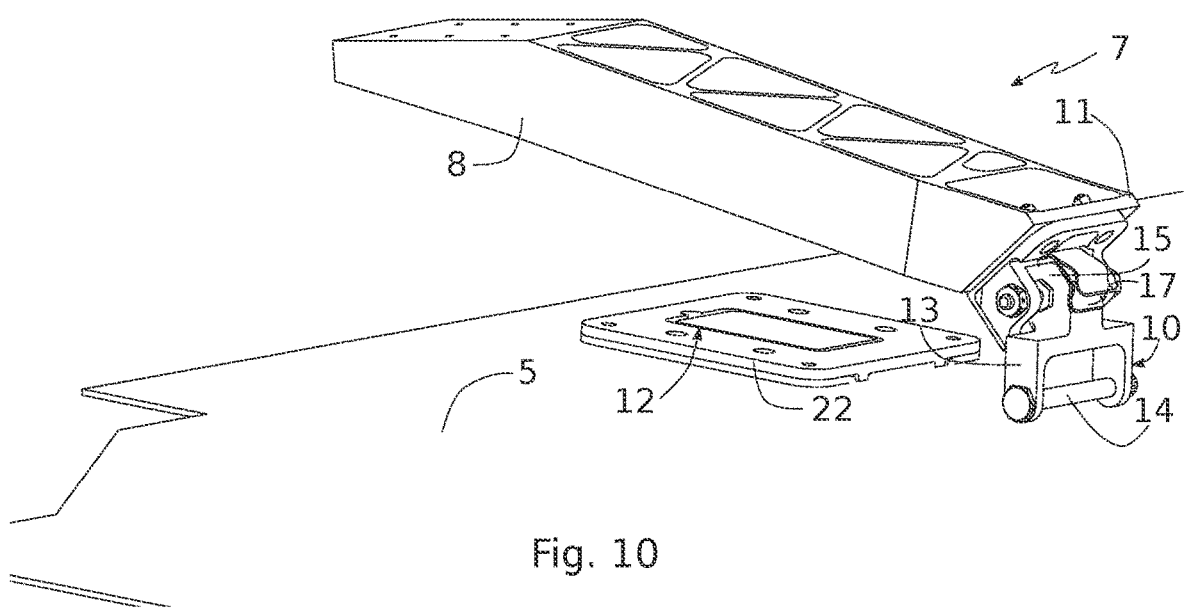
FIG. 10 is a perspective view of the retaining assembly in a first position, the retraction means being in the deactivated position.

The retaining assemblies 7 also each have means for retracting the second retaining member 12, which means are movable between a primed position, in which the second retaining member 12 protrudes from the floor 5 of the aircraft (position visible to FIGS. 1 to 3), and a deactivated position, in which the second retaining member 12 is retracted into the floor 5 of the aircraft (see FIG. 10).

In the position of FIG. 1, the retaining means of the deployable evacuation device 6 are in the disarmed position, because the first retaining member 10 is freely movable with respect to the second retaining member 12. However, the retraction means are in the primed position. This configuration corresponds for example to the flight configuration of the aircraft, in which the deployment of the deployable evacuation device 6 is required when the door is opened.

From this configuration of FIGS. 1 to 3, the door opening sequences which will therefore trigger the deployable evacuation device 6 will now be described with reference to FIGS. 4 to 9.

The primed position of the retraction means causes the hook 20 to be positioned in the path of the retaining bar 14 when the door is being opened. In this example, the opening of the door causes the leaf 2 to move toward the outside of the fuselage 1.

Figure 4:
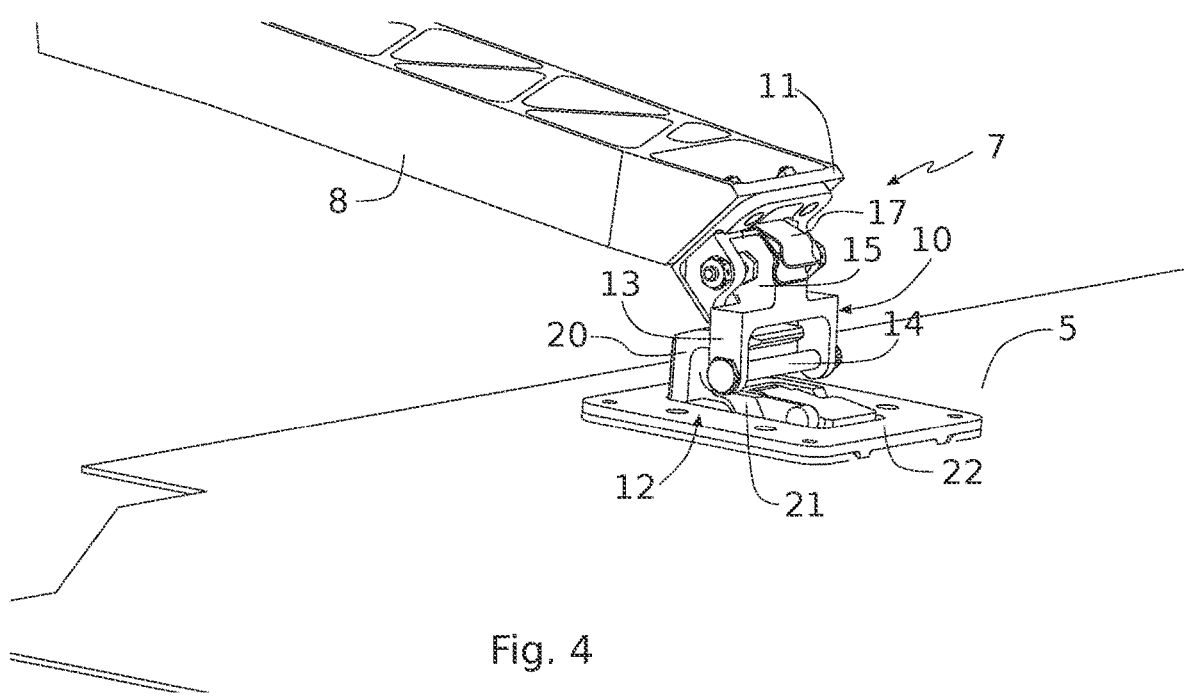
FIG. 4 is a perspective view of the retaining assembly in a second position, the retraction means being in the primed position.
Figure 5:
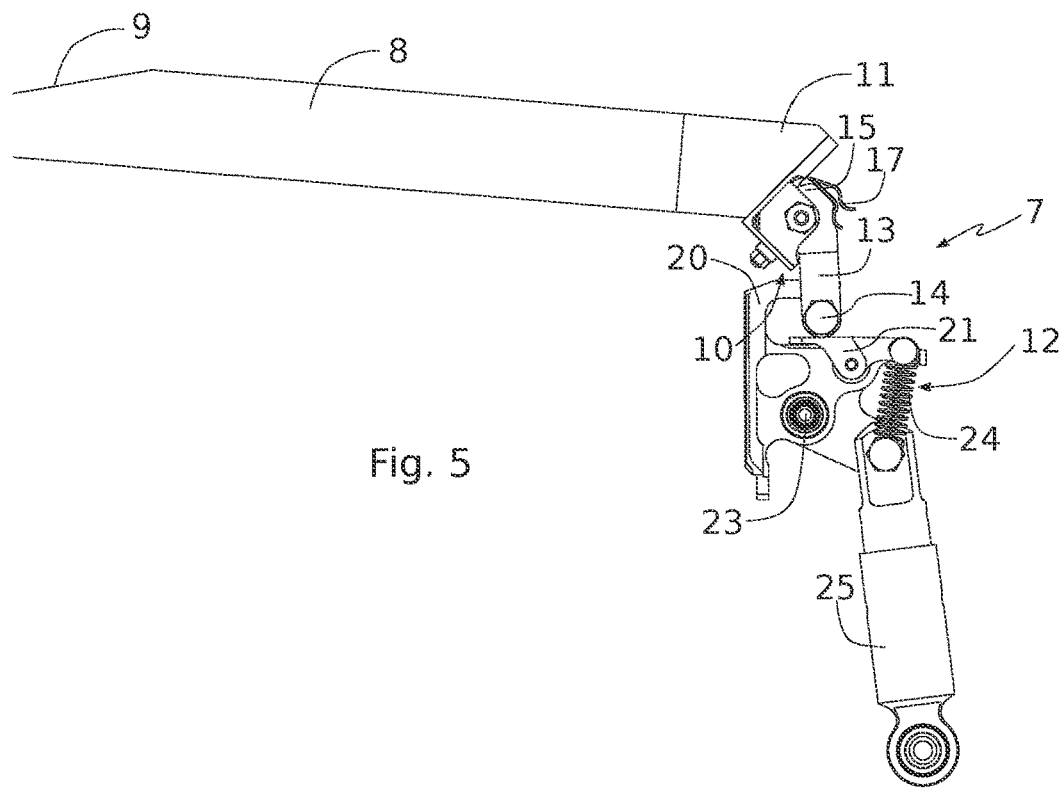
FIG. 5 is a profile view of FIG. 4.

During this movement, the path of the leaf 2 causes a displacement of the first retaining member 10 with respect to the second retaining member 12 until the retaining bar 14 meets the pawl 21 (position shown in FIGS. 4 and 5). FIGS. 4 and 5 show, in perspective and in profile respectively, this position in which the retaining bar 14 pushes the pawl 21 back.

FIG. 5 shows the second retaining member 12 without its chassis 22, thereby making it possible to see the internal elements of the second retaining member 12. The second retaining member 12 thus has a pivot pin 23 via which the hook 20 is mounted so as to rotate on the chassis 22. The pawl 21, for its part, is mounted so as to rotate on the hook 20 and closes the entrance to the hook 20 by virtue of a return spring 24. A gas cylinder 25 acts as a spring and makes it possible to hold the hook 20 in its two stable positions (protruding, as in FIG. 5, or retracted).

Between the positions of FIGS. 1 to 3 and that of FIGS. 4 and 5, the aircraft door has an opening movement range of the leaf 2 in which the retaining means remain awaiting engagement, although the retaining means are already armed. Within this range, the leaf 2 can therefore be closed again (in the event that, for example, it has been opened by mistake) without the retaining means, although they are armed, having passed into the engaged position and therefore without running the risk of triggering the deployable evacuation device 6.

Figure 6:
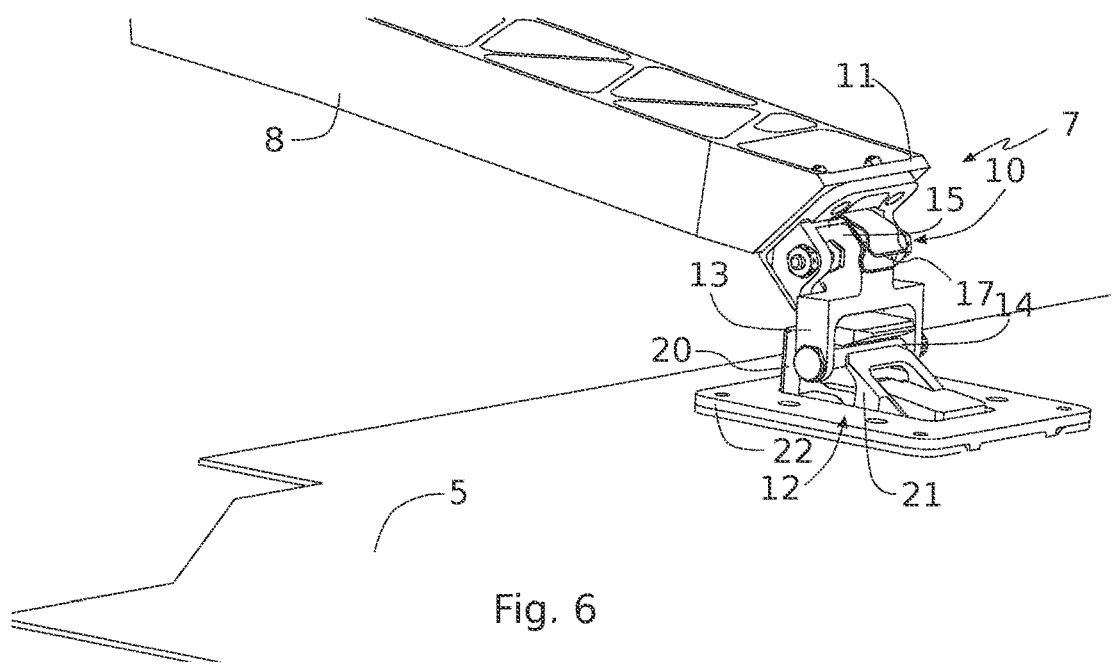
FIG. 6 is a perspective view of the retaining assembly in a third position, the retraction means being in the primed position.
Figure 7:
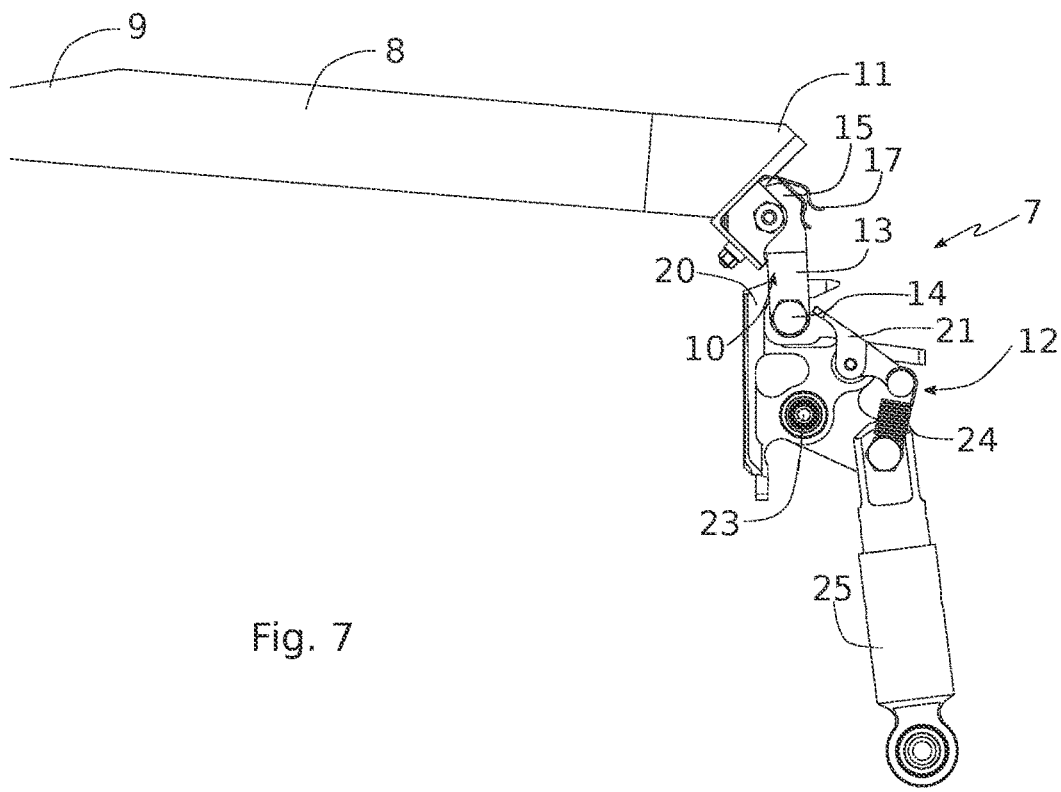
FIG. 7 is a profile view of FIG. 6.

FIGS. 6 and 7 show, in perspective and in profile respectively, the position in which the retaining bar 14 is engaged in the hook 20, a position which occurs when the opening movement continues. The pawl 21 has returned to its original position and prevents disengagement of the first retaining member 10 and the second retaining member 12. This position of FIGS. 6 and 7 corresponds to an automatic passage of the retaining means in the engaged position.

Figure 8:
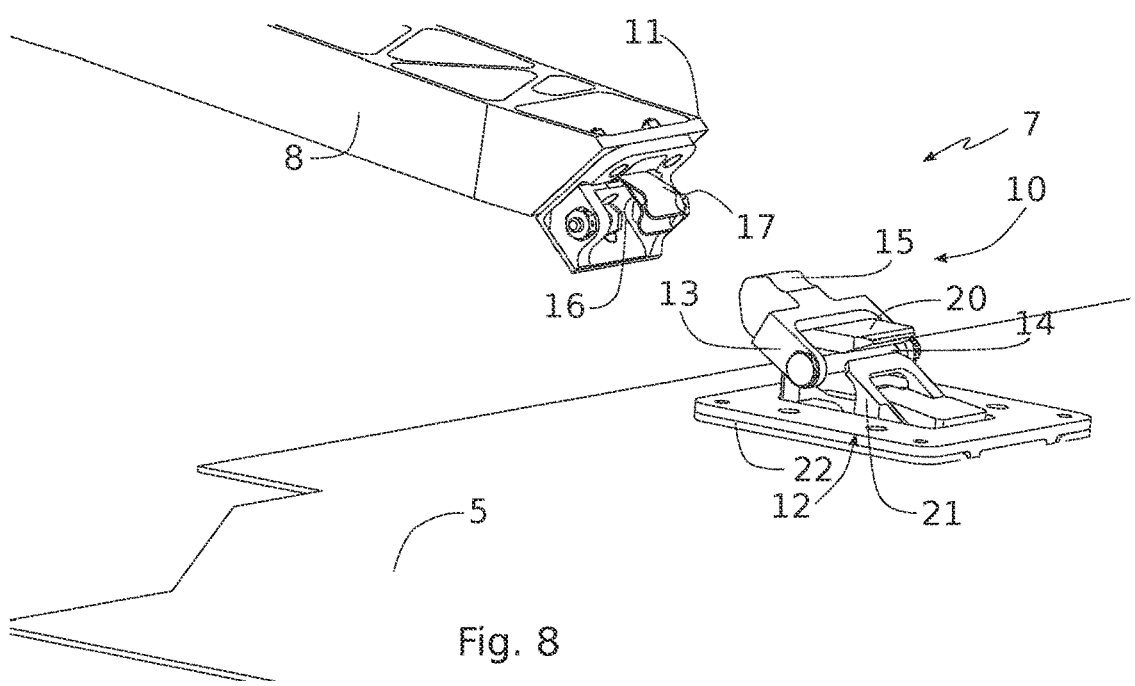
FIG. 8 is a perspective view of the retaining assembly in a fourth position, the retraction means being in the primed position.
Figure 9:
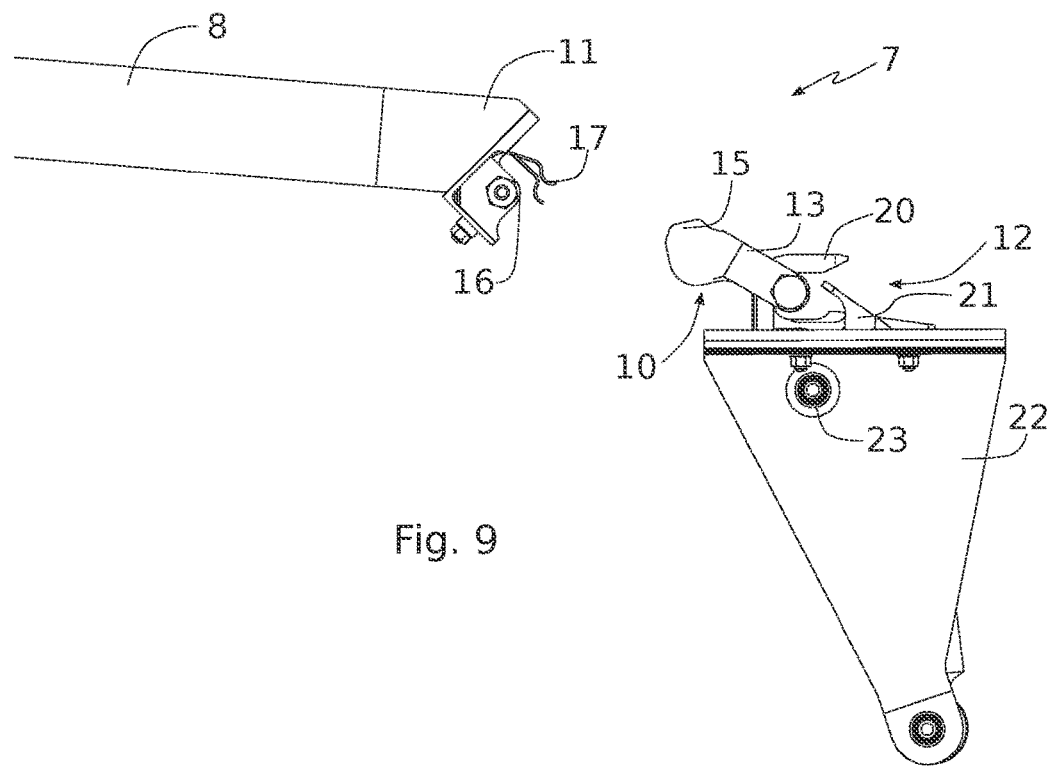
FIG. 9 is a profile view of FIG. 8.

Continuing to open the door then leads to the position illustrated in FIGS. 8 and 9 showing the retaining assembly in perspective and in profile respectively. From the position of FIGS. 6 and 7, the retaining bar 14 remains engaged in the hook 20 and continuing the movement leads to a pull on the attachment means 16, 17 causing the first retaining member 10 and the beam 8 to come away. The tensile force between the beam 8 and the first retaining member 10 specifically leads to the elastic deformation of the elastic tab 17 such that the fixing head 15 is removed from the fixing receiving portion 16.

Continuing the opening movement, beyond the position of FIGS. 8 and 9, then leads to the opening of the door while the first retaining member 10 remains secured to the second retaining member 12, and therefore of the door frame 3. Since the first retaining member 10 is connected to the deployable evacuation device 6 by the strap 19 (not shown in FIGS. 2 to 15), the movement of the leaf which carries the deployable evacuation device causes the strap 19 to pull on the trigger, and therefore causes the triggering of the deployable evacuation device.

The deployable evacuation device 6 is therefore connected to the door frame 3 via the first retaining member 10, which is held secured to the second retaining member 12.

The retraction means of the second retaining member 12 comprise, in the present example, the chassis 22 and the pivot pin 23, the gas cylinder 25 and possible control means (not shown) making it possible to shift the hook 20 between its two positions: protruding and retracted. These control means may be realized by any mechanical and/or electrical means designed to pivot the hook 20, such as, for example, an electric motor, a rack, a lever and cam system, etc. These retraction means are actuated when it is a question of configuring the second retaining member 12 in one of its positions:

protruding, which causes the retaining means to pass into the engaged position automatically when the door is being opened and only when the door is being opened, the retaining means being in the armed position but awaiting engagement as long as the door has not been handled;

retracted, which allows the door to open freely, keeping the retaining means in the disarmed position, and therefore without triggering the deployable evacuation device 6.

The opening configuration of the door during normal operation, in which the retraction means are in the deactivated position, will now be described with reference to FIGS. 10 to 15. This deactivated position of the retraction means corresponds to a normal opening situation of the door of an aircraft on the ground, that is to say in the presence of airport equipment intended for the boarding and disembarkation of passengers. The crew then actuates the retraction means in their deactivated position, thereby, in the present example, causing the second retaining member 12 to be held in its retracted position.

Figure 11:
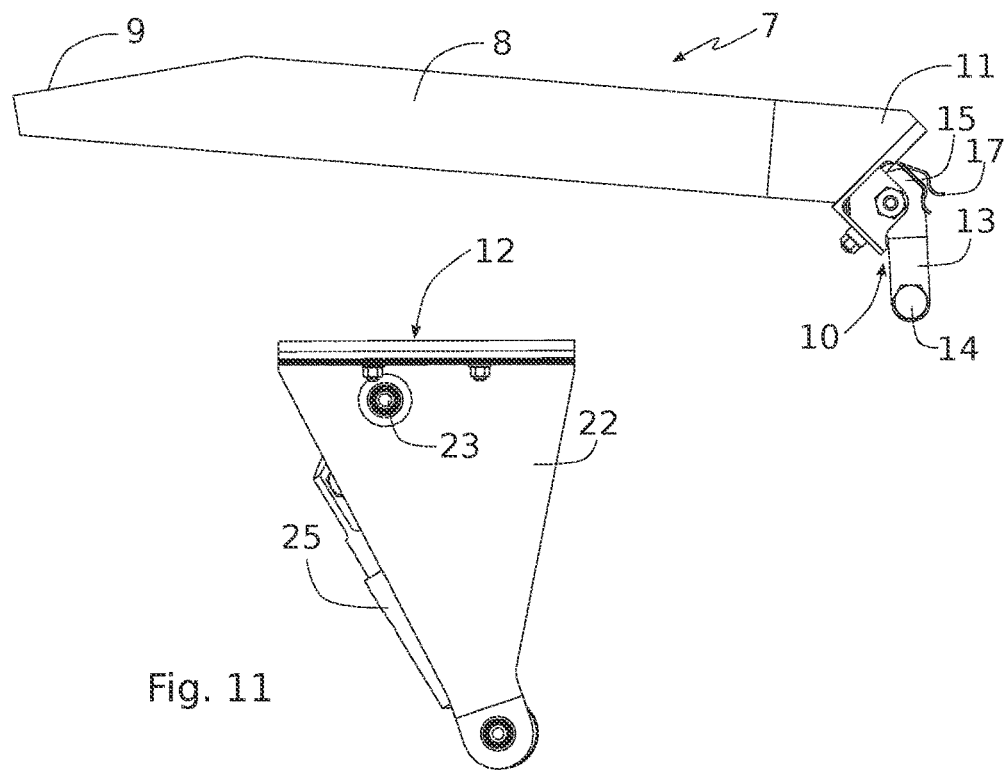
FIG. 11 is a profile view of FIG. 10.

FIGS. 10 and 11 are views similar to FIGS. 2 and 3, respectively, except that the retraction means are in their deactivated position. In this configuration, the retaining means remain in the disarmed position and will not pass automatically into the engaged position when the door is opened.

Figure 12:
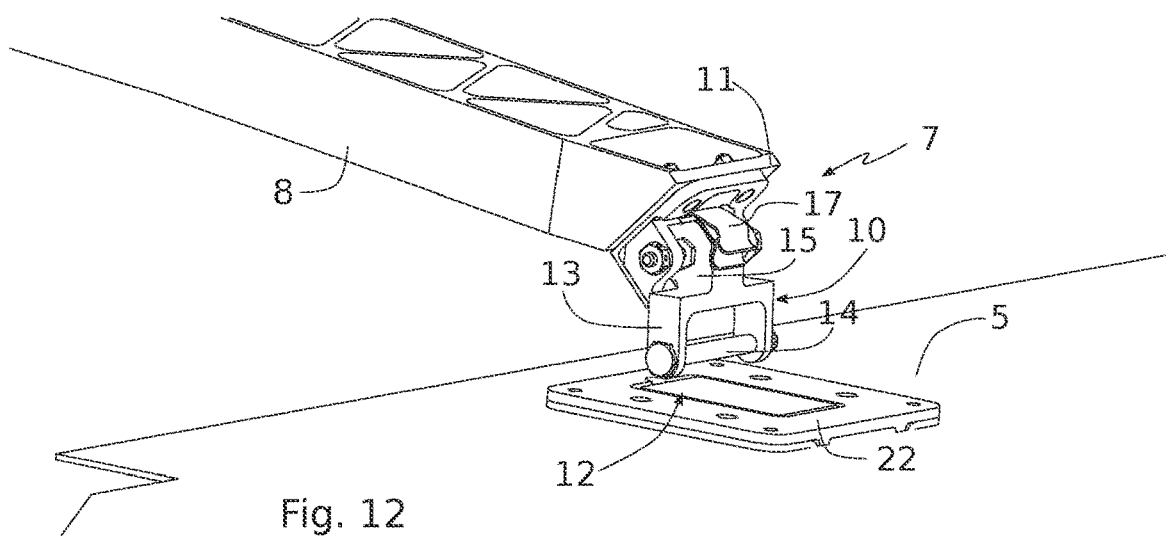
FIG. 12 is a perspective view of the retaining assembly in a second position, the retraction means being in the deactivated position.
Figure 13:
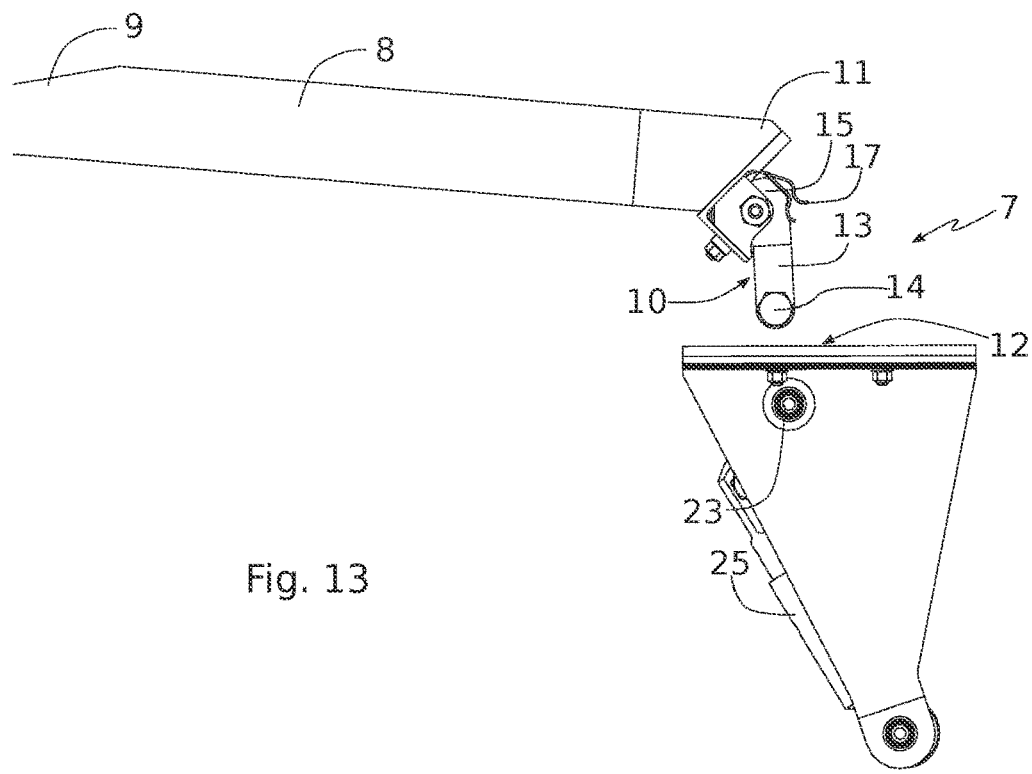
FIG. 13 is a profile view of FIG. 12.

From the positions of FIGS. 10 and 11, an opening movement of the leaf 2 causes the beam 8 to be displaced as far as the position of FIGS. 12 and 13. In this configuration, the second retaining member 12, which is in the retracted position, is no longer in the path of the first retaining member 10 and the retaining bar 14 passes next to the second retainer 12 without interacting with it.

Figure 14:
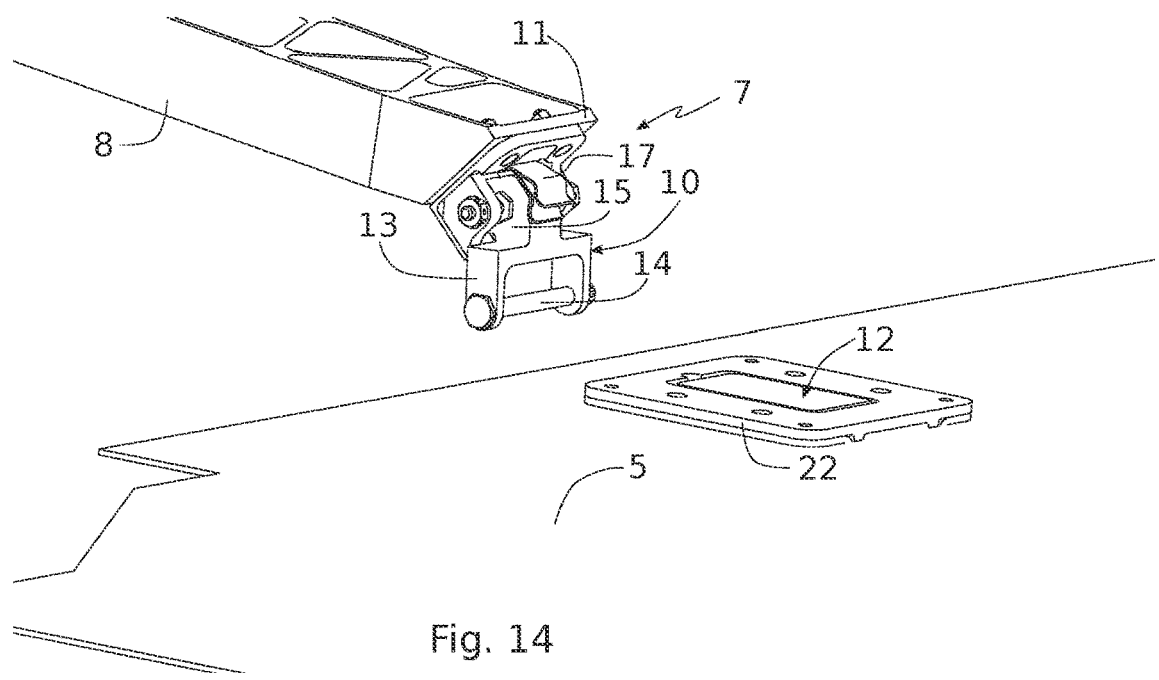
FIG. 14 is a perspective view of the retaining assembly in a third position, the retraction means being in the deactivated position.
Figure 15:
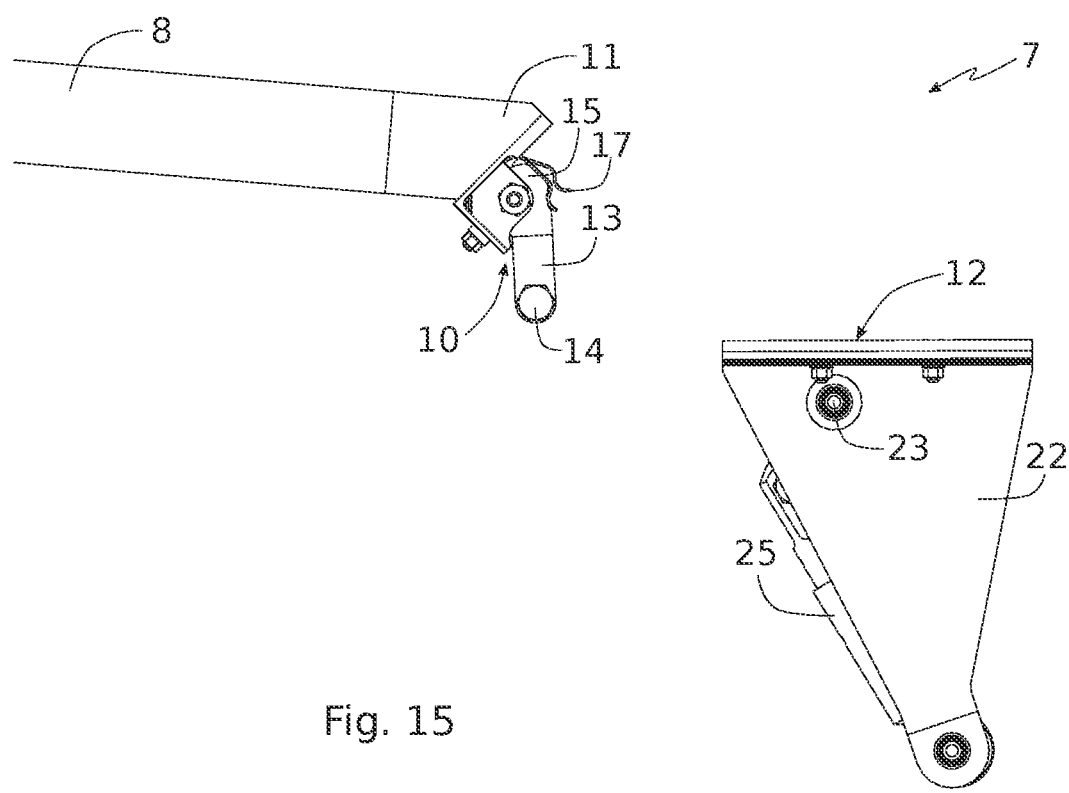
FIG. 15 is a profile view of FIG. 14.

The door opening movement then continues as far as the position of FIGS. 14 and 15 in which the leaf 2 is opened without the deployable evacuation device 6 being triggered.

Alternative embodiments of the aircraft door can be implemented without departing from the scope of the invention. In particular, the detachable clip may be realized by any other means, for example by an assembly with a breakable pin, allowing the first retaining member 10 to be fixed to the beam 8, while being detachable when a tensile force greater than a predetermined threshold is applied to the retaining member 10.

Similarly, the coupling means between the first and second retaining members may be realized differently; the first retaining member may be equipped with a hook and the second retaining member may be equipped with a retaining bar, for example, or any other configuration of coupling means.

Furthermore, the example described above concerns a second retaining member 12 which can be retracted into the floor of the aircraft. However, it is also possible to provide that the retraction means act on the first retaining member 10, for example by folding it against the beam, such that the primed position causes deployment of the first retaining member, and such that the deactivated position causes its withdrawal. The second retaining member is thus present or not present in the path of the first retaining member when the door is being opened. In such an example, the second retaining member and its hook are therefore fixed. This fixed hook protrudes to a greater extent than the retractable hook described as an example, but its bulk remains greatly reduced in comparison with the protruding jaws of the prior art.

The invention claimed is:

1. An aircraft door comprising:
    a door frame (3) having a threshold portion (4) extending under a floor (5);
    a leaf (2) having an internal face intended to be turned toward an interior of an aircraft, the leaf (2) being movable with respect to the door frame (3) between a closed position and an open position;
    a deployable evacuation device (6) mounted on the leaf (2) and having retaining devices designed to assume: an armed position, in which the retaining devices are secured to the door frame (3), and a disarmed position, in which the retaining devices are freely movable relative to the door frame (3);
    wherein the retaining devices comprise at least one retaining assembly (7) which comprises:
    a beam (8) having a first end (9) fixed to the internal face of the leaf (2), the beam (8) extending substantially perpendicularly to the leaf (2);

a first retaining member (10) fixed to a second end (11) of the beam (8) via a detachable clip (16, 17), a first retaining member (10) being connected to the deployable evacuation device (6);

a second retaining member (12), couplable to the first retaining member (10), mounted on the door frame (3);

retraction devices for retracting the second retaining member (12) that are movable between: a primed position, in which the second retaining member (12) protrudes from the floor (5) in the path of the first retaining member (10) when the leaf (2) passes from its closed position to its open position; and a deactivated position, in which the second retaining member (12) is outside the path of the first retaining member (10) when the leaf (2) passes from its closed position to its open position.

2. The aircraft door as claimed in claim 1, wherein the second retaining member (12) is movable between a protruding position and a retracted position, the retraction devices being associated with the second retaining member (12), such that the primed position of the retraction device triggers the protruding position of the second retaining member (12), and the deactivated position of the retraction device triggers the retracted position of the second retaining member (12).

3. The aircraft door as claimed in claim 2, wherein the retraction devices have a chassis (22) and a pivot pin (23) on which the second retaining member (12) is mounted pivotably between the retracted position and the protruding position.

4. The aircraft door as claimed in claim 3, wherein the retraction devices have an elastic device (25) pushing the second retaining member (12) back into its stable protruding or retracted position.

5. The aircraft door as claimed in claim 1, wherein the detachable clip has an elastically deformable fixing element (17) to fix the first retaining member (10) to the beam (8).

6. The aircraft door as claimed in claim 5, wherein the detachable clip has a fixing receiving portion (16) on the beam (8) and also an elastic tab (17), and the first retaining member (10) has a fixing head (15) designed to be received in the fixing receiving portion (16) and to be held in place by the elastic tab (17).

7. The aircraft door as claimed in claim 1, wherein one of the first (10) and the second (12) retaining member has a retaining bar (14) and the other of the first (10) and the second (12) retaining member has a hook (20) couplable to the retaining bar (14).

8. The aircraft door as claimed in claim 7, wherein the hook (20) has a pawl (21) to hold the retaining bar (14) in the hook (20).

9. The aircraft door as claimed in claim 1, wherein the leaf (2) comprises a door structure (18), and in that the beam (8) is fixed to the door structure (18).

10. The aircraft door as claimed in claim 1, wherein the second retaining member (12) is mounted on the threshold portion (4) of the door frame (3).

11. A method to open the aircraft door as claimed in claim 1 comprising the following steps:
  placing the retraction devices in the primed position;
  driving the leaf (2) in an opening movement along a first travel in which the first retaining member (10) is driven until it meets the second retaining member (12);
  continuing the opening movement of the leaf (2) along a second travel in which the first retaining member (10) remains coupled to the second retaining member (12) and comes away from the beam (8).

* * * * *